(12) United States Patent
Ardhanari et al.

(10) Patent No.: US 7,737,999 B2
(45) Date of Patent: Jun. 15, 2010

(54) USER INTERFACE FOR VISUAL COOPERATION BETWEEN TEXT INPUT AND DISPLAY DEVICE

(75) Inventors: Sankar Ardhanari, Windham, NH (US); Satyanarayanan Ramaswamy, Windham, NH (US); Manish Mohan Sharma, Ghaziabad (IN); Murali Aravamudan, Windham, NH (US); Ajit Rajasekharan, West Windsor, NJ (US)

(73) Assignee: Veveo, Inc., Andover, MA (US)

( * ) Notice: Subject to any disclaimer, the term of this patent is extended or adjusted under 35 U.S.C. 154(b) by 385 days.

(21) Appl. No.: 11/509,909

(22) Filed: Aug. 25, 2006

(65) Prior Publication Data

US 2007/0061754 A1 Mar. 15, 2007

Related U.S. Application Data

(60) Provisional application No. 60/711,867, filed on Aug. 26, 2005.

(51) Int. Cl.
*G09G 5/00* (2006.01)
*G06T 11/00* (2006.01)
*G06F 3/041* (2006.01)

(52) U.S. Cl. .................. 345/685; 345/467; 345/169; 345/173

(58) Field of Classification Search .................. 345/685, 345/467, 169, 173
See application file for complete search history.

(56) References Cited

U.S. PATENT DOCUMENTS

| | | | |
|---|---|---|---|
| 5,818,437 A | 10/1998 | Grover et al. | |
| 5,945,928 A | 8/1999 | Kushler et al. | |
| 5,953,541 A | 9/1999 | King et al. | |
| 6,008,799 A | * 12/1999 | Van Kleeck | ............... 345/173 |
| 6,011,554 A | 1/2000 | King et al. | |
| 6,266,048 B1 | 7/2001 | Carau | |
| 6,286,064 B1 | 9/2001 | King et al. | |

(Continued)

FOREIGN PATENT DOCUMENTS

EP 1143691 10/2001

(Continued)

OTHER PUBLICATIONS

US. Appl. No. 60/548,589, filed Sep. 15, 2005, Flinchem.

(Continued)

*Primary Examiner*—Xiao M Wu
*Assistant Examiner*—David T Welch
(74) *Attorney, Agent, or Firm*—Wilmer Cutler Pickering Hale and Dorr LLP

(57) ABSTRACT

A user-interface system for entering an alphanumeric string or alphanumeric clusters for identifying information content is presented. The user-interface system has presentation logic for displaying an image of a virtual user alphanumeric interface on a presentation device. The virtual user alphanumeric interface includes an image of an overloaded keypad that has a two dimensional configuration of alphanumeric clusters. Each cluster corresponds to a set of alphanumeric characters. The user-interface system also has cluster selection logic for receiving user actions from an input device (e.g., five-button interface) to provide visual cues to help the user select an alphanumeric cluster and to cause the selected alphanumeric cluster or character from a cluster to be displayed in a display field of the virtual user alphanumeric interface.

23 Claims, 14 Drawing Sheets

U.S. PATENT DOCUMENTS

| | | | |
|---|---|---|---|
| 6,307,548 | B1 | 10/2001 | Flinchem et al. |
| 6,307,549 | B1 | 10/2001 | King et al. |
| 6,529,903 | B2 | 3/2003 | Smith |
| 6,614,422 | B1 * | 9/2003 | Rafii et al. ............. 345/168 |
| 6,865,575 | B1 | 3/2005 | Smith |
| 6,907,273 | B1 | 6/2005 | Smethers |
| 6,965,374 | B2 | 11/2005 | Villet et al. |
| 7,136,854 | B2 | 11/2006 | Smith |
| 7,225,455 | B2 | 5/2007 | Bennington et al. |
| 2002/0059066 | A1 * | 5/2002 | O'Hagan ............. 704/231 |
| 2003/0067495 | A1 * | 4/2003 | Pu et al. ............. 345/811 |
| 2003/0097661 | A1 * | 5/2003 | Li et al. ............. 725/109 |
| 2004/0021691 | A1 | 2/2004 | Dostie et al. |
| 2004/0046744 | A1 | 3/2004 | Rafii et al. |
| 2005/0129199 | A1 * | 6/2005 | Abe ............. 379/90.01 |
| 2005/0192944 | A1 | 9/2005 | Flinchem |
| 2005/0210402 | A1 | 9/2005 | Gunn et al. |
| 2005/0223308 | A1 | 10/2005 | Gunn et al. |
| 2006/0044277 | A1 * | 3/2006 | Fux et al. ............. 345/168 |
| 2006/0112162 | A1 | 5/2006 | Marot et al. |
| 2006/0136379 | A1 * | 6/2006 | Marino et al. ............. 707/3 |
| 2006/0156233 | A1 * | 7/2006 | Nurmi ............. 715/532 |
| 2006/0163337 | A1 | 7/2006 | Unruh |
| 2006/0167676 | A1 | 7/2006 | Plumb |
| 2006/0256078 | A1 | 11/2006 | Flinchem et al. |
| 2006/0274051 | A1 | 12/2006 | Longe et al. |
| 2007/0005563 | A1 | 1/2007 | Aravamudan |
| 2007/0050337 | A1 | 3/2007 | Venkataraman |
| 2007/0061754 | A1 | 3/2007 | Ardhanari et al. |
| 2007/0143567 | A1 | 6/2007 | Gorobets |

FOREIGN PATENT DOCUMENTS

| | | |
|---|---|---|
| WO | WO-2005033967 | 4/2005 |
| WO | WO-2005084235 | 9/2005 |

OTHER PUBLICATIONS

International Search Report, International Application No. PCT/US06/33204, mailed Sep. 21, 2007 (2 pages).

Matthom, "Text Highlighting in Search Results", Jul. 22, 2005. Available at www.matthom.com/archive/2005/07/22/text-highlighting-in-search-results; retrieved Jun. 23, 2006. (4 pages).

Talbot, David. "Soul of a New Mobile Machine." *Technology Review: The Design Issue* May/Jun. 2007. (pp. 46-53).

* cited by examiner

| CLR | SP | DEL | |
|-----|----|----|---|
| A | B | C | D |
| E | F | G | H |
| I | J | K | L |
| M | N | O | P |
| Q | R | S | T |
| U | V | W | X |
| Y | Z | 0 | 1 |
| 2 | 3 | 4 | 5 |
| 6 | 7 | 8 | 9 |

FIG. 2 (PRIOR ART)

| Letter | Frequency (per 463 letters) |
|---|---|
| e | 57.2 |
| t | 42.6 |
| a | 38.0 |
| o | 35.5 |
| n | 32.6 |
| i | 31.3 |
| h | 29.8 |
| s | 28.6 |
| r | 25.5 |
| d | 22.2 |
| l | 18.2 |
| u | 13.5 |
| w | 11.8 |
| m | 11.7 |
| c | 10.6 |
| f | 10.4 |
| g | 9.6 |
| y | 9.0 |
| p | 7.6 |
| b | 6.9 |
| k | 4.0 |
| v | 4.0 |
| j | 0.8 |
| x | 0.6 |
| q | 0.4 |
| z | 0.3 |

FIG. 9

USER INTERFACE FOR VISUAL COOPERATION BETWEEN TEXT INPUT AND DISPLAY DEVICE

CROSS-REFERENCE TO RELATED APPLICATIONS

This application claims the benefit under 35 U.S.C. §119 (e) of U.S. Provisional Patent Application No. 60/711,867, filed on Aug. 26, 2005, entitled User Interface for Text Entry Input to a Television, which is herein incorporated by reference in its entirety.

BACKGROUND

1. Field of Invention

The present invention relates to techniques for text entry input into a search interface that assists users in both stages of text entry, including (1) locating the desired characters without having to look at the physical text entry device and (2) selecting the desired character or symbol.

2. Description of Related Art

User interface options to enter text input to a television using a remote control are currently very limited and cumbersome. Some remote controls just have numerals and do not have alphabets on the keypad as illustrated in FIG. 1. To overcome the limitation of the absence of alphabets on the remote control, some interfaces display a mapping of the keys of the remote control to the letters of the alphabet. The user must then find the appropriate key corresponding to the desired letter in the map and then look at the physical device to select the appropriate number key (a cognitive task that is perceived to be cumbersome by an average user). Another approach used in practice today is to have both numerals and alphabets listed in the form of a matrix as illustrated in FIG. 2 and have the user navigate the matrix using the five button interface (FIG. 3). This interface solves the problem of not having to look at the remote, but fails to address the long traversal paths between characters (explained in detail below).

Two prominent options for text entry input to television in practice today are (1) keypad based text entry and (2) "navigation and select" based text entry. Most keypad text entry interfaces in use today require the user to look at the remote control device to locate a character. This makes the interface hard to use, because the user has to toggle his visual focus between the remote control and the television screen. Additionally, looking at the remote control while watching television is cumbersome since the ambient lighting in the room may not be sufficient to see the remote control (e.g. watching television at night and in the dark).

Current "navigation and select" interfaces are also lacking, because the planar navigation distance is quite high in some of the popular interfaces for text entry, such as TIVO® (FIG. 2). A 10×4 matrix is shown, making it hard for user to easily locate a character on the screen —user needs to navigate long distances in order to reach between characters (the maximum traversal path is 12 hops to select an alphabet/number, assuming row and column movement only). The familiarity a user gains over time with usage does not assist in reducing the distance traversed between keys. This lack of reduction in effort expended would be perceived in most users' minds as a cumbersome interface.

An interface that can assist the user to (1) locate the desired character without having to look at the remote control and (2) select the located character easily from an overloaded keypad (or from an input device lacking a keypad), would significantly reduce the effort expended by the user to enter text.

SUMMARY

The invention provides methods and systems enabling a user to enter text into a search interface. The methods and systems allow the user to enter text without looking at the physical text entry device.

In accordance with one embodiment of the invention, a user-interface system for entering an alphanumeric string for identifying information content has presentation logic for displaying an image of a virtual user alphanumeric interface on a presentation device. The virtual user alphanumeric interface includes an image of an overloaded keypad that has a two dimensional configuration of alphanumeric clusters. Each cluster corresponds to a set of selectable alphanumeric characters. The virtual user alphanumeric interface further includes a string field for displaying the alphanumeric string of selected alphanumeric characters. The user-interface system also has selection logic for receiving user actions from an input device to select an alphanumeric cluster and to select an alphanumeric character from the set of selectable alphanumeric characters corresponding to the selected cluster to cause the selected character to be displayed in the string field of the virtual user alphanumeric interface.

In accordance with another embodiment of the invention, a user-interface system for entering at least one alphanumeric cluster for identifying information content has presentation logic for displaying an image of a virtual user alphanumeric interface on a presentation device. The virtual user alphanumeric interface includes an image of an overloaded keypad that has a two dimensional configuration of alphanumeric clusters. Each cluster corresponds to a set of alphanumeric characters. The virtual user alphanumeric interface further includes a display field for displaying at least one selected alphanumeric cluster. The user-interface system also has cluster selection logic for receiving user actions from an input device to select an alphanumeric cluster and to cause the selected alphanumeric cluster to be displayed in the display field of the virtual user alphanumeric interface. The user-interface system can also have character selection logic for receiving user actions from the input device to select an alphanumeric character from the set of alphanumeric characters corresponding to the selected cluster and causing the selected character to be visually emphasized in the display field of the virtual user alphanumeric interface.

According to one or more embodiments, each character of at least one of the sets of selectable alphanumeric characters is selectable by acting only on the corresponding cluster.

According to one or more embodiments, the presentation device is separate from the input device so that the user can enter the alphanumeric string while focusing on the presentation device.

According to one or more embodiments, an alphanumeric cluster is selectable via a cluster selection action and a cluster-character selection action selects one of the alphanumeric characters corresponding to the selected cluster.

According to one or more embodiments, the cluster selection action is pressing one of a plurality of buttons on the input device, the button pressed being mapped to a desired alphanumeric cluster of the virtual user alphanumeric interface. According to one or more embodiments, the cluster selection action is a planar navigation action on the input device.

According to one or more embodiments, the cluster-character selection action is pressing one of a plurality of buttons on the input device, the button pressed being mapped to the alphanumeric clusters of the virtual user alphanumeric interface corresponding to a desired alphanumeric character. According to one or more embodiments, the cluster-character selection action is pressing a character selection button on the input device.

According to one or more embodiments, the set of selectable alphanumeric characters of at least one cluster is presented in alphabetical order. According to one or more embodiments, the set of selectable alphanumeric characters of at least one cluster is presented in an order according to an alphabet occurrence frequency of a predetermined language. According to one or more embodiments, the set of selectable alphanumeric characters of at least one cluster is presented in an order according to an alphabet occurrence frequency of characters in words that describe items in a searchable collection of information content. According to one or more embodiments, a presentation order of the set of selectable alphanumeric characters of at least one cluster is changed from an initial presentation order based on the received user actions.

According to one or more embodiments, a user-interface system also has display logic to visually emphasize the selected alphanumeric cluster. According to one or more embodiments, a user-interface system also has display logic to visually emphasize the selected alphanumeric character.

BRIEF DESCRIPTIONS OF DRAWINGS

For a more complete understanding of various embodiments of the present invention, reference is now made to the following descriptions taken in connection with the accompanying drawings in which:

FIG. 2 illustrates an example of a text input display;

FIG. 9 illustrates the frequency of occurrence of letters of the alphabet in the English language;

DETAILED DESCRIPTION

Preferred embodiments of the invention provide techniques for assisting a user to enter text into a search interface. These techniques include providing for visual cooperation between a remote control text entry device and a display device. These techniques facilitate text entry without the need to look back-and-forth between the remote control device and display device while entering text, and facilitate entry for capability limited input devices, such as five button interfaces. A television remote control (e.g., with five button control) and television screen is one example of a pair of devices that can benefit from aspects of the invention. Examples involving television systems are provided below, in part because of the well-known nature of televisions. Thus, embodiments can be used to search for content items that can be displayed on televisions, e.g., television shows or movies. However, use of the invention is not limited to television systems and television content, as aspects of the invention are useful to any interface requiring text input.

Figure 3:
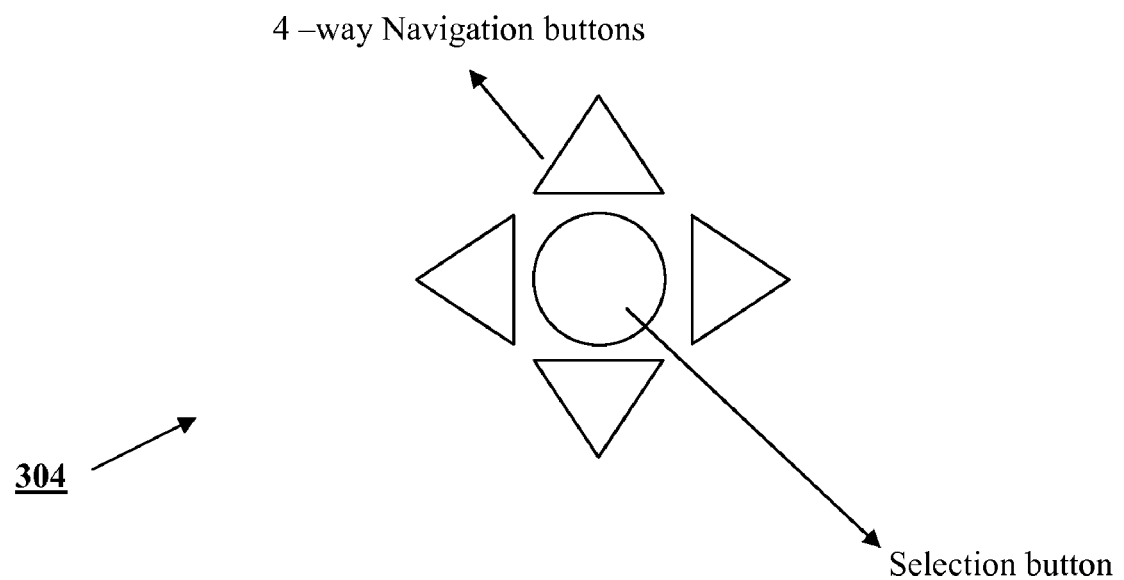
FIG. 3 illustrates a five button control interface.
Figure 4:
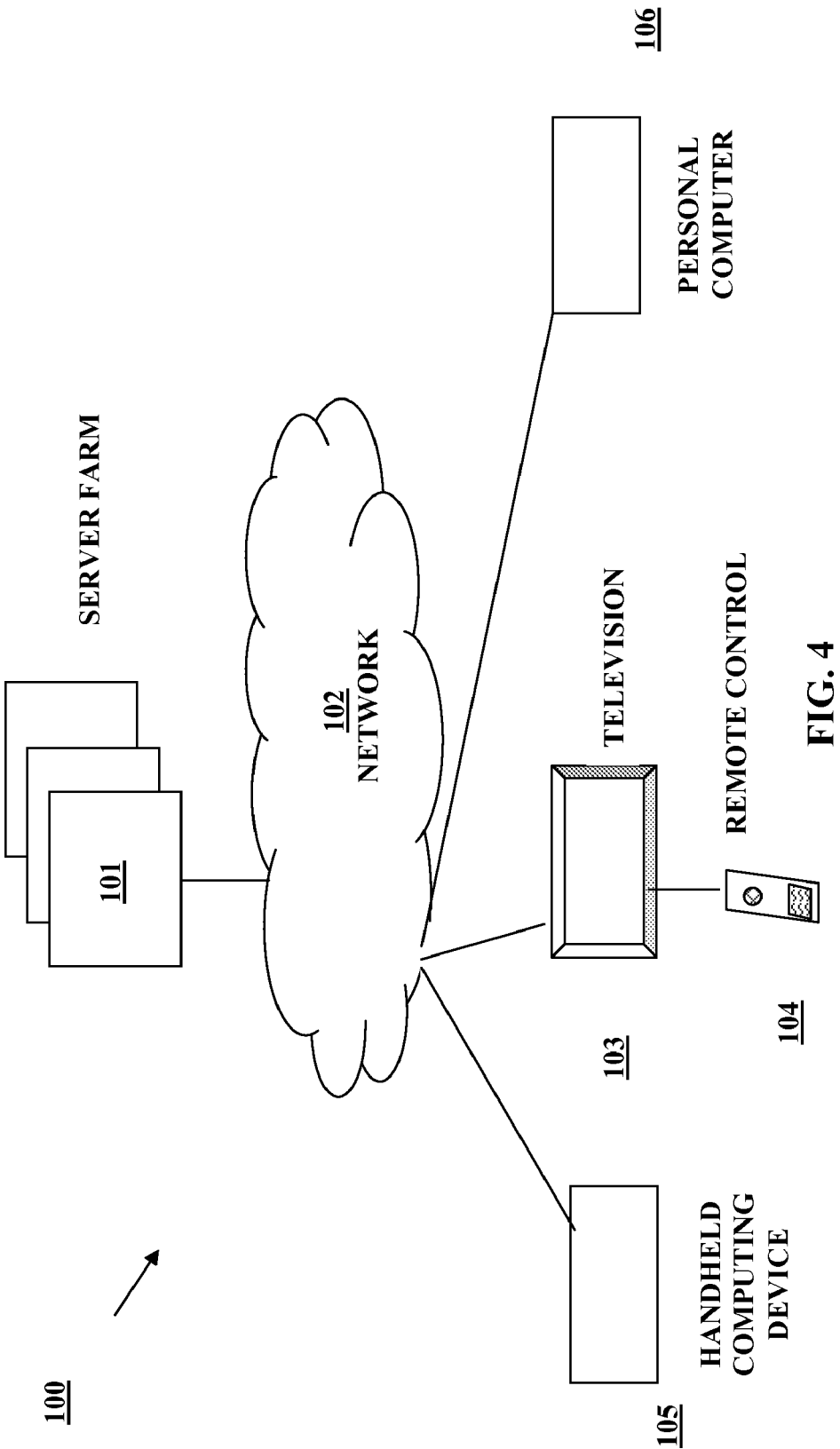
FIG. 4 illustrates a text entry system used in a different range of network configurations in accordance with certain embodiments of the invention.

Referring to FIG. 4, an overall system 100 for text entry on a television in accordance with an embodiment of the invention is illustrated. A server farm 101 serves as the source of media data with the network 102 functioning as the distribution framework. The distribution could be a combination of wired and wireless connections. The television 103 is coupled with a remote control 104 having an keypad or a touchpad interface (e.g. capacitive touchpad made by SYNAPTICS™) along with a five-button control (FIG. 3) for navigation. A handheld computing device 105 and a personal computer 106 can also access data residing on the server farm 101 via the network 102. Thus, embodiments of the invention can be used with the handheld computing device 105 and/or the personal computer 106.

Figure 5:
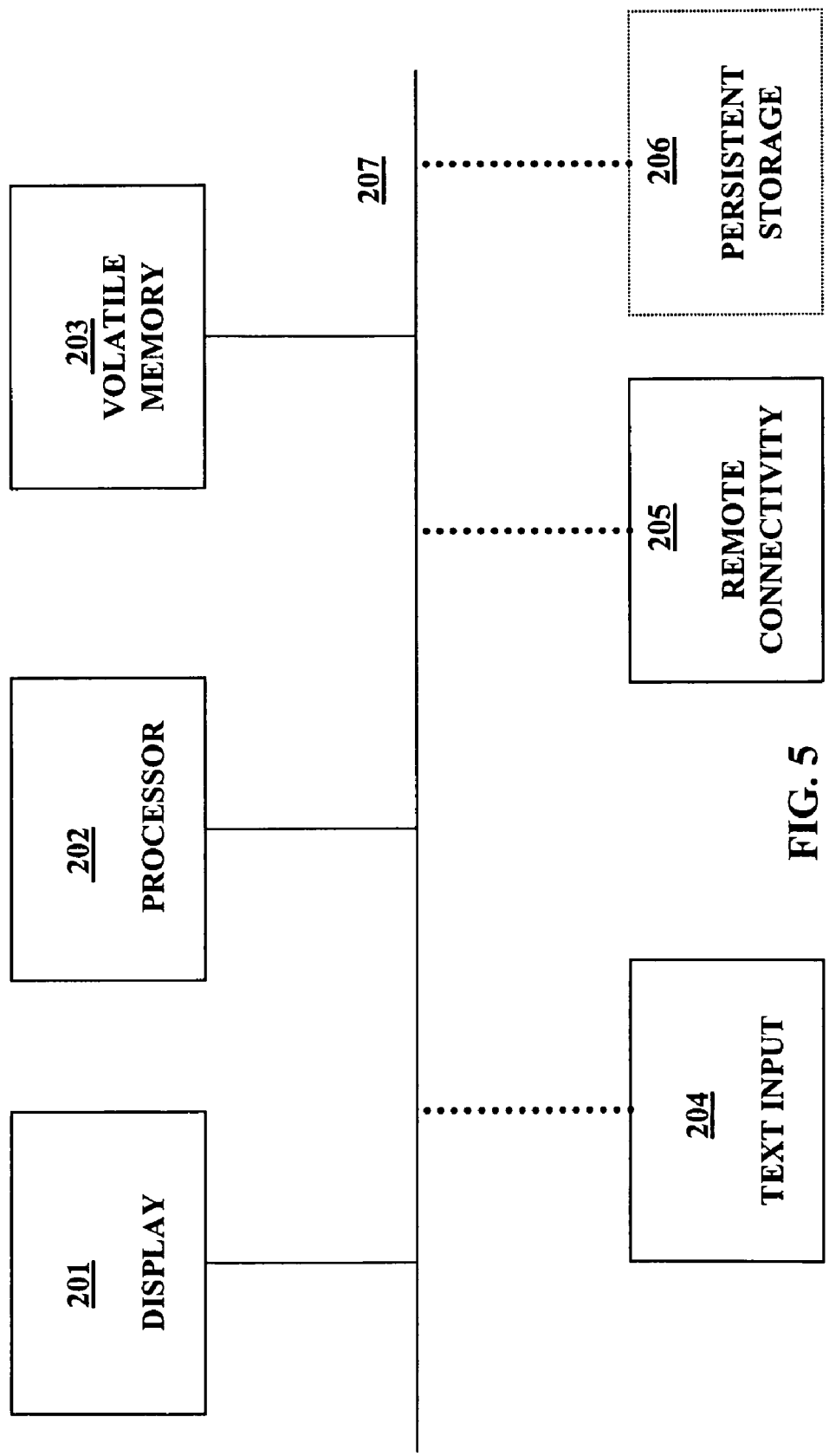
FIG. 5 illustrates a television configuration to perform text entry in certain embodiments.

Referring to FIG. 5, according to the embodiment, a television 103 has display 201, a processor 202, volatile memory 203, text input interface 204, which is through a wireless remote control 104, remote connectivity 205 to a server 101 through a network 102, and a persistent storage 206.

Figure 6:
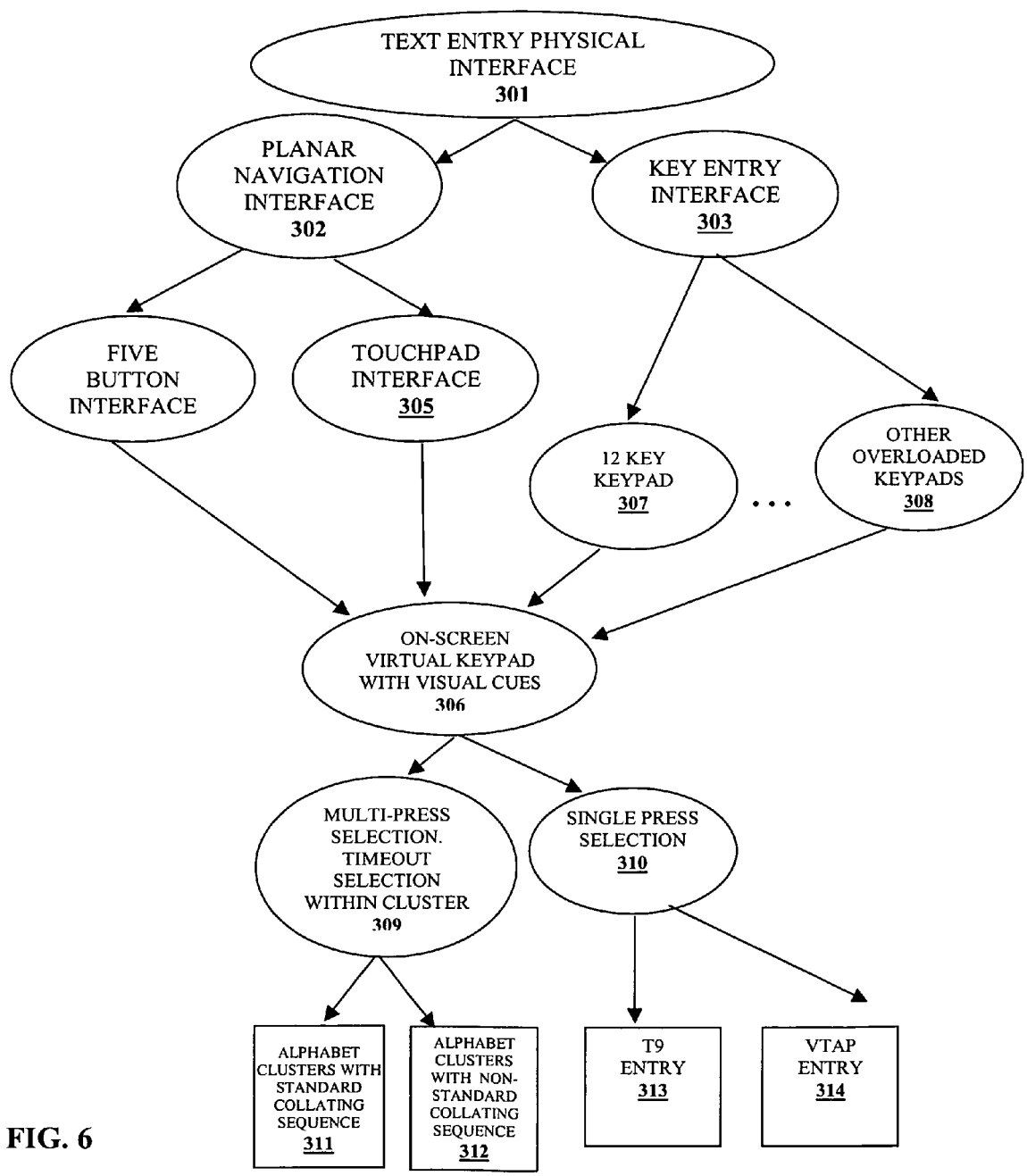
FIG. 6 illustrates the various text entry methods and styles of text input of certain embodiments.
Figure 8:
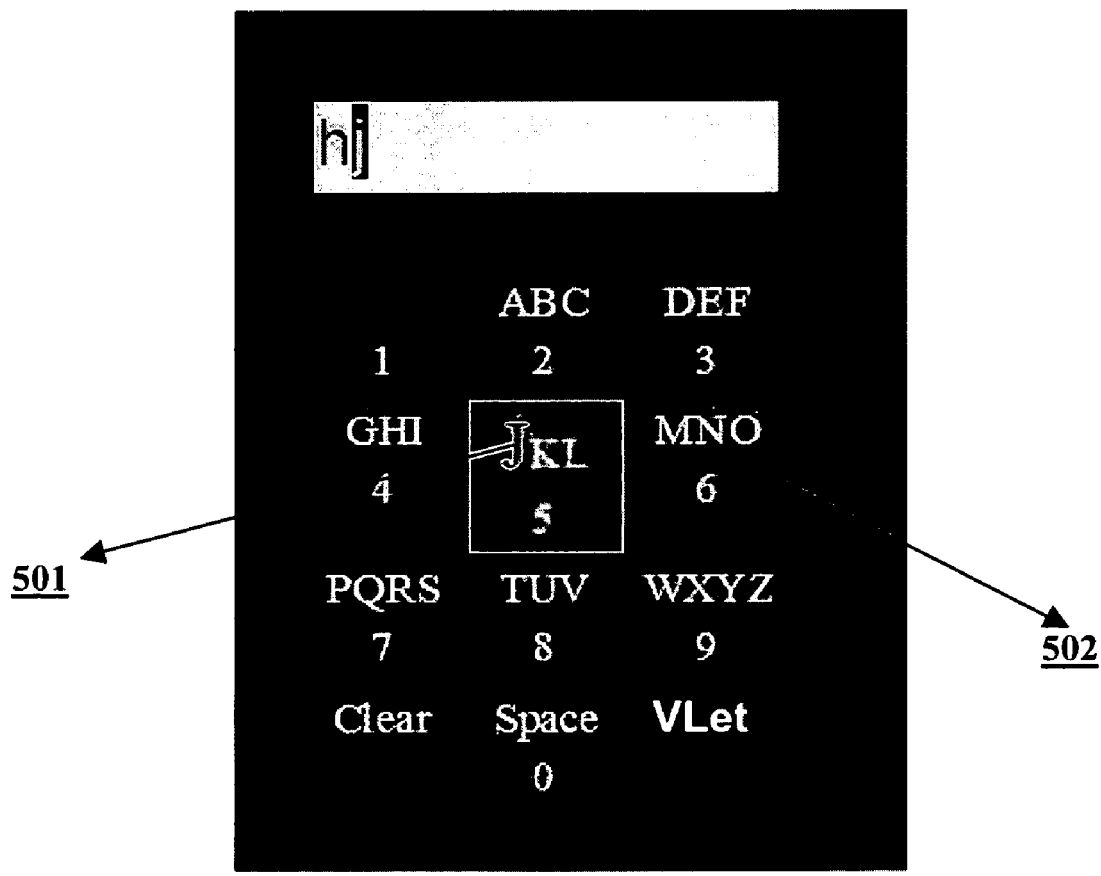
FIG. 8 illustrates an embodiment of the on-screen virtual keypad on screen with a highlighted character and key.

Referring to FIG. 6, multiple text entry interface methods and text input styles 301 of the embodiment are illustrated. Planar navigation interfaces 302, such as a five-button interface 304 (FIG. 3) or a touchpad interface 305 can avoid the user having to look at the physical remote, by using an on-screen virtual keyboard 306 with visual cues to assist users to locate a character (as described in detail below). An example of one possible virtual keyboard 306 is shown in FIG. 8. Even for key entry interfaces 303, which could range from a 12-key keypad interface 307 to other keypad layouts with overloaded keys 308, the on-screen virtual keypad with visual cues 306 assists users to locate a character without having to look at the physical remote control.

As used herein, the term "overloaded" used in reference to keys, keypads, or keyboards describes a condition where a cluster of multiple different letters or numerals are associated with a single key, and one or more of the letters or the numeral of the cluster can be selected using a single key, whether by pressing the key a single time or by pressing the key multiple times. The 2-9 digit keys of a mobile telephone implementation of the T9® text input method are examples of what is meant by overloaded keys because, for example, pressing the 2 digit key can enter the letters A, B, C, or the numeral 2. Another example of overloaded keys are the 2-9 digits of a mobile telephone implementation of the multi-tap text entry method where the user can cycle through the letters and numeral of a single key by pressing the single key multiple times in sequence. The term overloaded is not meant to apply to traditional QWERTY keyboards, or similar keyboards, that require the keyboard user to press an additional key to access an additional character set. Thus, the 4 key of a typical QWERTY keyboard is not considered overloaded because the Shift key must be engaged in order to access the $ symbol associated with the 4 key.

The on-screen virtual keypad interface provides sufficient visual cues for both the stages of text input without having to look at the remote control (1) for the user to navigate to a key and (2) to select a particular character from the overloaded key. For instance, text may be entered using planar navigation, wherein an on-screen cursor is manipulated using a five-button interface 304 (FIG. 3). During planar navigation, the navigation path is automatically highlighted as the cursor moves from one key to the next, enabling the user to be properly oriented to locate a character.

The virtual keypad of the embodiment can be used to assist in both multi-press style input 309 and single press style text input (e.g., T9® style input 313 or "VTAP" style text input 314 described below). T9® style input enables the user to enter each character of the query string by a single press on an overloaded keypad. User gets to a desired word from a choice of multiple words generated by the ambiguous text entry. The VTAP style text input is similar to T9® in that it enables user to get to a desired result for a corresponding search input where a single key press for each character forms the text entry of the query string. The VTAP style text input differs from T9® in that ambiguous text input generates search results matching the ambiguous sequence of letters rather than merely returning possible word choices that form the query itself. Thus, one example of a VTAP style text input results in all letters and numerals associated with the particular key pressed being entered into a single character position of the search input. In VTAP style input, the input query could be either a single word or word prefix input (matching a single word or multiple phrase prefixes) or a multi-phrase word or prefix input (matching a multiple phrase prefixes). Additional aspects of the VTAP style text input are described in U.S. patent application Ser. No. 11/312,908, filed on Dec. 20, 2005, entitled Method and System For Dynamically Processing Ambiguous, Reduced Text Search Queries and Highlighting Results Thereof, hereby incorporated by reference.

In the case of direct key selection on the device, be it a multi-press 309 or single press 310 style input, the on-screen keypad 306 of the embodiment provides a visual cue in the form a highlighted key that helps orient the user on the physical device keypad. Furthermore, the highlight of the last key pressed is made persistent so as to maintain the user's orientation on the physical device keypad when selecting the next character. In the case of the planar navigation method (using, for example, a five-button interface 304), user can cycle through the characters of the overloaded key cluster by pressing the central button in the five-button interface (FIG. 3). While cycling through the characters, visual cue of the current selection is shown. For example, the current letter may be enlarged or highlighted in a unique color (as shown by the "J" in alphabet 501 in FIG. 8). The alphabet cluster on a key may be rendered in the standard lexicographic collating sequence of the language 311 or it may be ordered based on other criteria such as the frequency (FIG. 9) of occurrence of the alphabet in the language 312.

Figure 7:
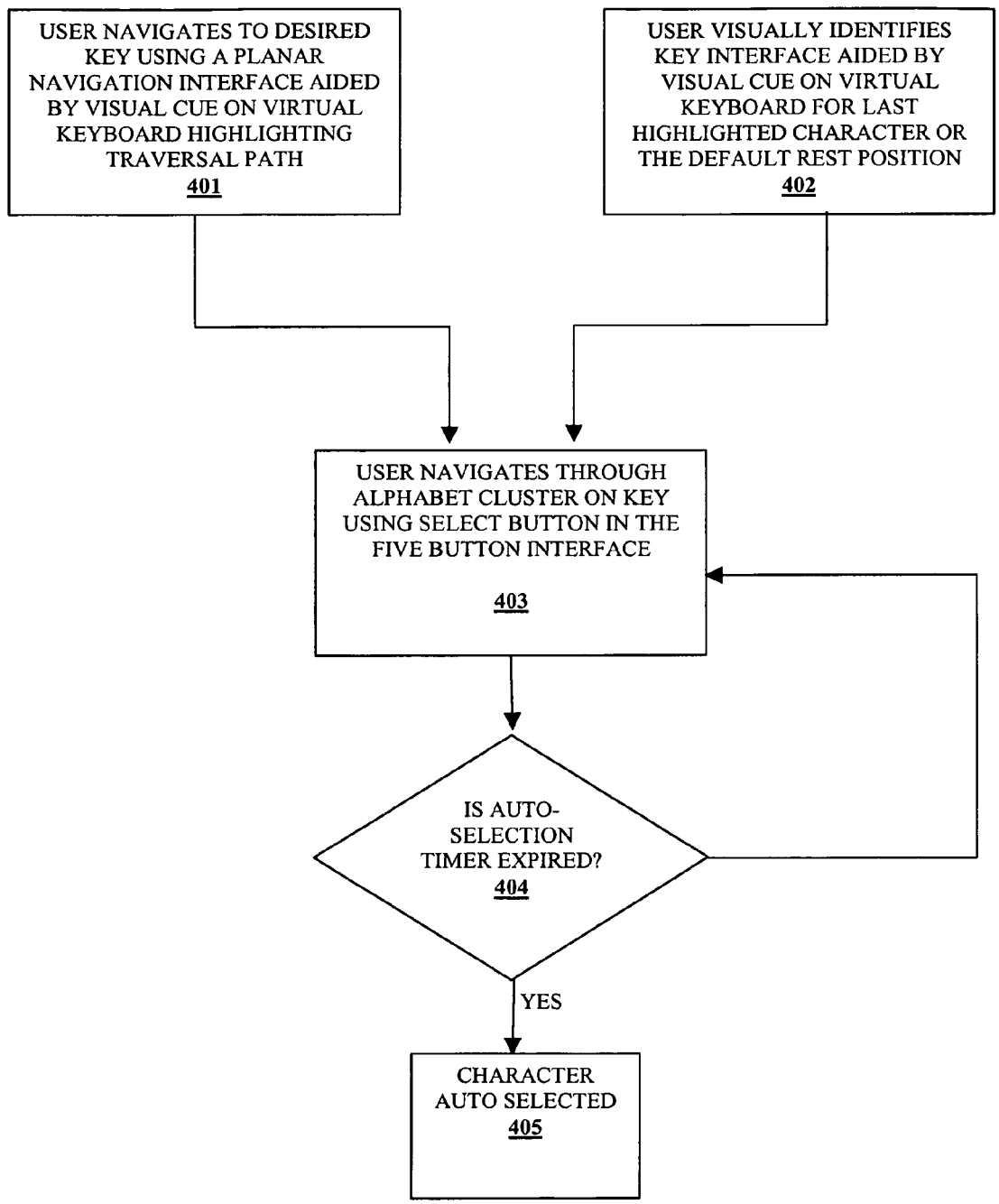
FIG. 7 illustrates a process of user locating a character using the on-screen virtual keypad cues and entering text in a multi-press style input according to certain embodiments.

FIG. 7 illustrates the usage of visual cues on the virtual keypad to help assist in selection of a particular character from the character cluster on a key using multi-press style text entry. In the first stage of text input, user either navigates 401 to a particular character using the five button interface (FIG. 3) or directly presses a key on the remote control aided by the visual cue on the on-screen keypad of the last character pressed 402. In the former case, the navigation trail is dynamically highlighted to fixate users' attention on the screen keypad interface 306 (e.g., a highlighted cursor may appear over the key currently in focus). The highlight on the selected focus may have a four-way navigation cue to inform the user that they can traverse using the five-button control. In an embodiment of the invention, visual cues are overlaid on a 12-key on-screen keypad (FIG. 8), since the traversal path on this keypad is lower in comparison to other keypads (FIG. 2).

For example, the maximum traversal path on the keypad of FIG. 8 is at most 6 hops in contrast to 12 hops on a TIVO® keypad (FIG. 2). In the example embodiment, this reduction in number of hops is achieved by having an automatic timeout based auto selection for character clusters, similar to the triple tap mode of text entry in practice today on most phones. The shortened planar navigation on a familiar keypad interface followed by selection of a character on the familiar multi-press text entry interface, with both steps aided by visual cues on on-screen keypad, liberates the user from the drudgery of both the "tiresome long navigation path" and the "ocular focus toggle"—two key text entry interface drawbacks that plague other user interface methods in practice today.

Once the user selects a key by either of the methods 401 or 402, user then navigates through the character cluster as described earlier 403. The users' choice is then automatically selected 405 once the timeout expires 404. If the user presses the center button in the five-button interface within the timeout period, then the next character in the character cluster is highlighted on the screen 306. The ease of cycling through the characters with just the press of a button, where the collating sequence on the key is rendered on the on-screen keypad, is a much less of a cognitive task than linearly navigating a larger space. The trade-off here is the potential tension introduced in the user's mind due to the timeout based auto-selection. Adjusting the timeout period dynamically to match the user's planar navigation rate can reduce this potential tension. The timeout may be adjustable by the user or the system may automatically adjust the timeout based on the user's interaction with the system. For example, based on the user's linear navigation rate (or the latency between inter-key press latency), the threshold for timeout for auto-selection could be adjusted. While this will always have a minimum threshold, this value could be higher for a person who is navigating the keypad very slowly.

FIG. 8 illustrates the highlighting of a key that was selected either by linear navigation or by direct key press. The collating sequence of alphabets (501 and 502) in this cluster is the standard lexicographic ordering, that is to say the letters of the cluster appear in alphabetical order. However, the alphabets in the cluster may be arranged according to a different order to reduce the number of user actions needed to select a desired letter of the cluster. For example, the alphabet occurrence frequency chart of FIG. 9 illustrates a frequency of occurrence of letters of the alphabet in a given word sample. The frequencies in the alphabet occurrence frequency chart can be determined for an entire language or for a particular searchable subset of content.

Figure 10:
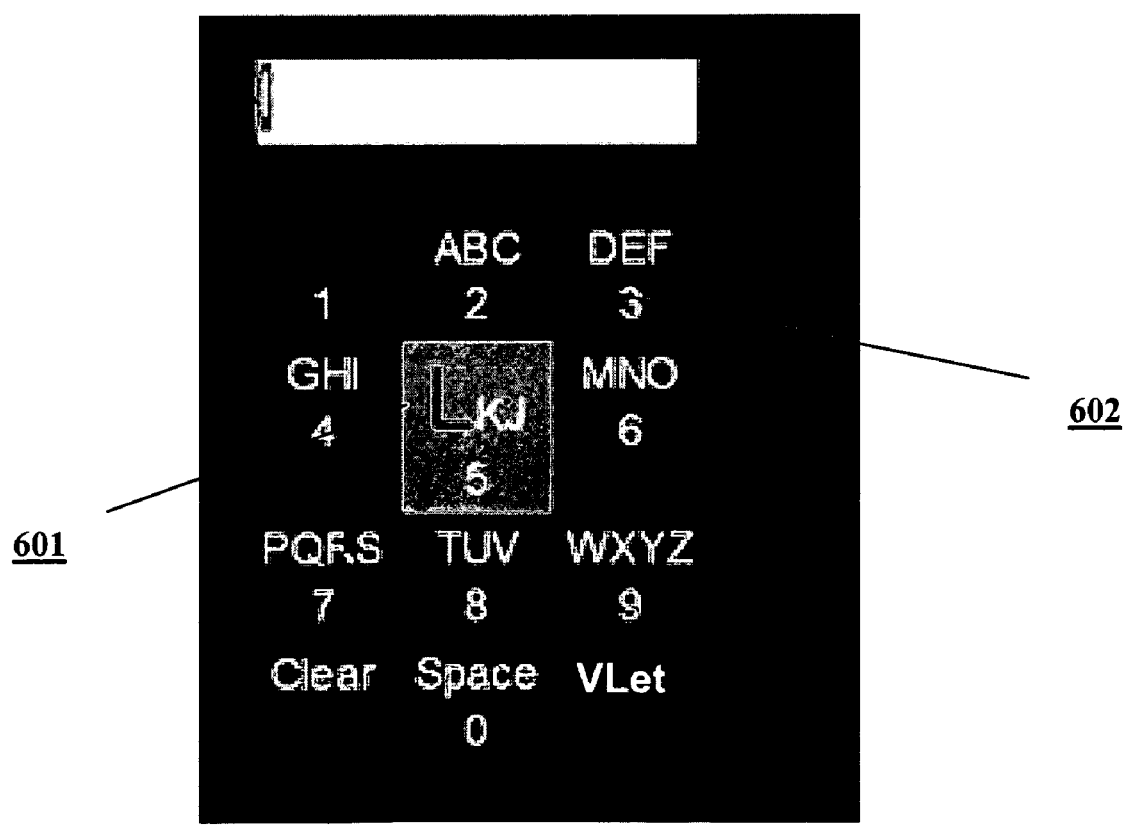
FIG. 10 illustrates a specialized collating sequence on a highlighted key as found in certain embodiments.
Figure 11:
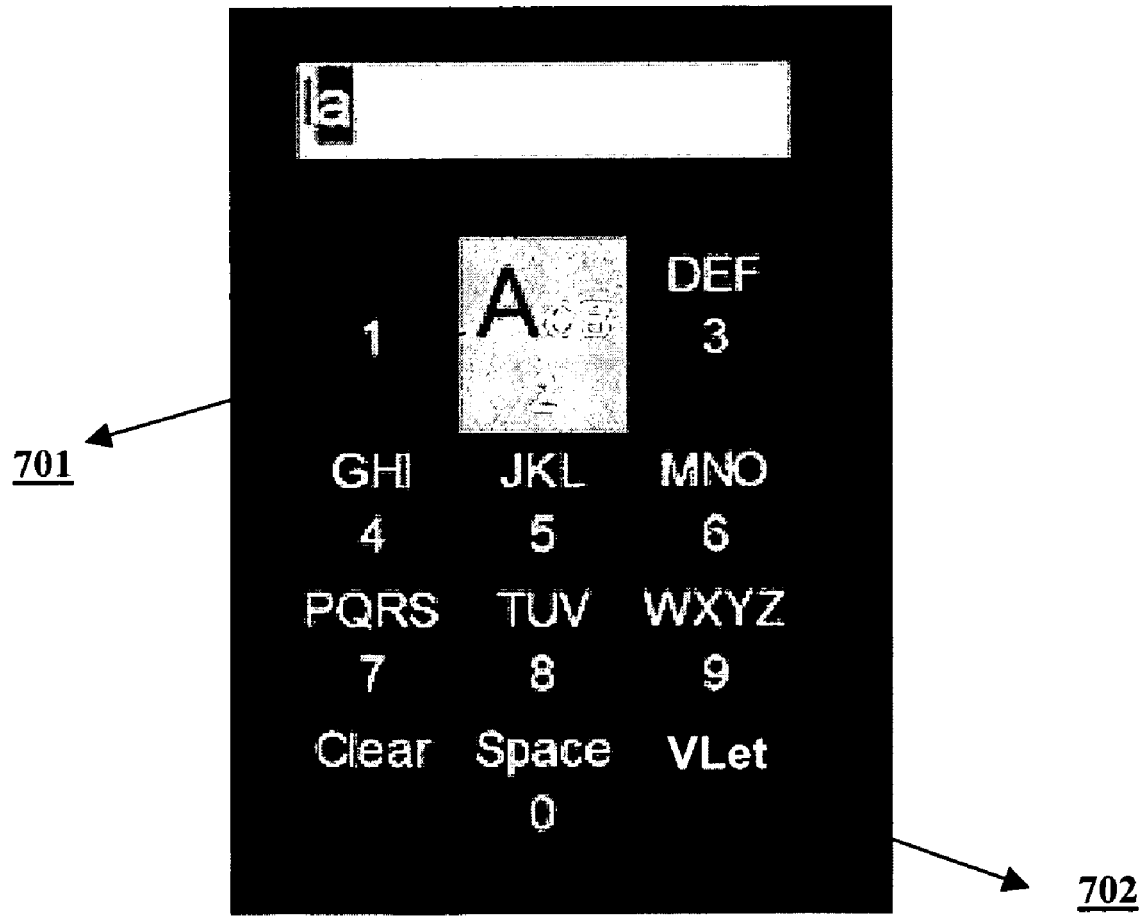
FIG. 11 illustrates a specialized collating sequence on a highlighted key as user is entering the second character according to certain embodiments.

FIG. 10 illustrates the on-screen keyboard highlighting where the collating sequence of characters on the cluster 601 are based on the alphabet occurrence frequency in the words of the language (FIG. 9). The alphabet cluster "ABC" 602 is in lexicographic order (i.e., alphabetical order). FIG. 11 illustrates that when the user selects a key (either by planar navigation or by direct key selection), the order of the characters of the key changes to the specialized collating sequence order 701. The mode of character ordering can be toggled between the standard lexicographic order or the "specialized collating sequence" order, and the current order can be visually displayed 702 (e.g., by the "VLet" designation). Even in the specialized collating sequence mode, the keys on virtual keypad in non-active mode (i.e., those keys not in focus) display keys in lexicographic order to assist user in easily navigating the keypad. By doing this, the system exploits the visuo-spatial memory etched into users' minds by the ubiquitous phone keypad. Since the same interface seamlessly supports multiple input styles, users can pick and choose the input style they are most comfortable with.

Figure 1:
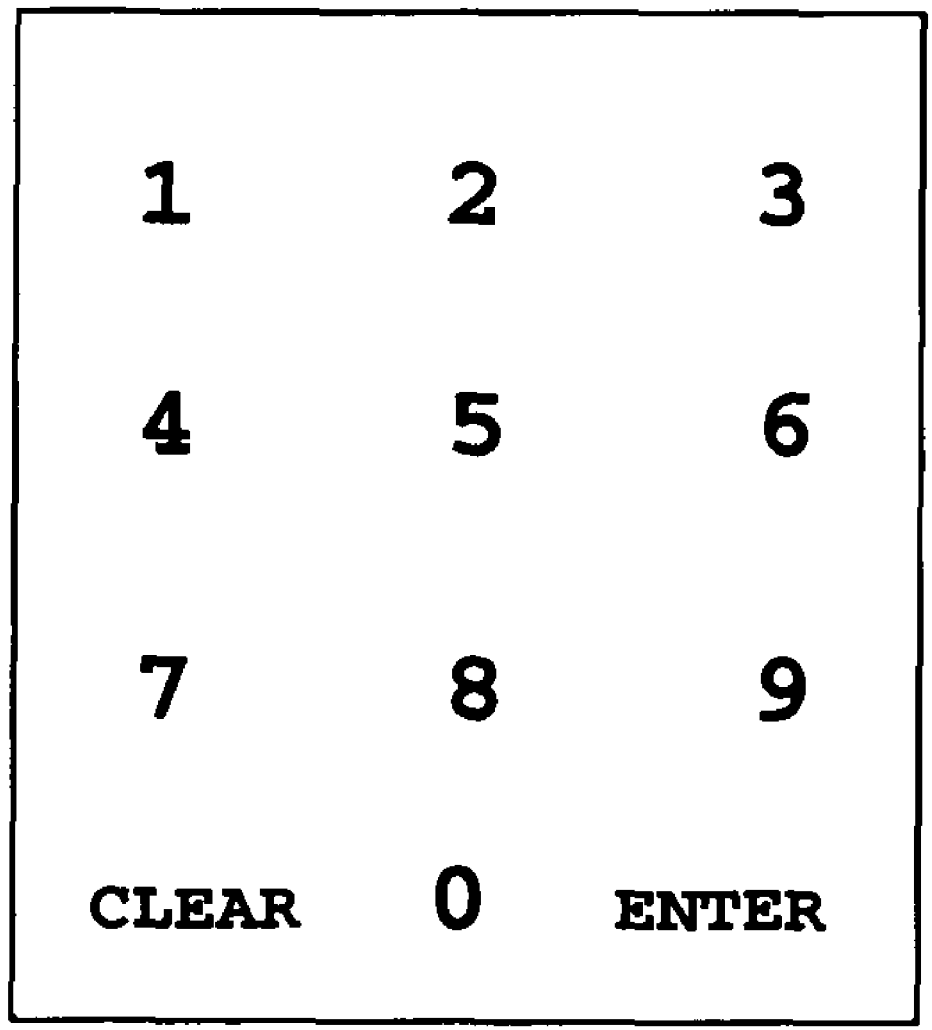
FIG. 1 illustrates an example of a numerical remote control.

In another embodiment of the invention, the collating sequence may be based on the actual frequency of occurrence of characters in the results space terms. The ordering sequence may even be dynamic based on the frequency of the alphabet from a particular set of data spaces (instead of just English), and the ordering itself could be a function of the character count user entered. The specialized collating sequence of character clusters (which is either statically or dynamically determined as described above) would obviate the need to even etch the alphabets on the physical remote control keypads since that ordering is subject to change dynamically. Thus the on-screen virtual keypad with visual cues enables all existing remote controls (even ones lacking letters, such as the one with numbers only as shown in FIG. 1) to be compatible with and benefit from the present invention.

Figure 12:
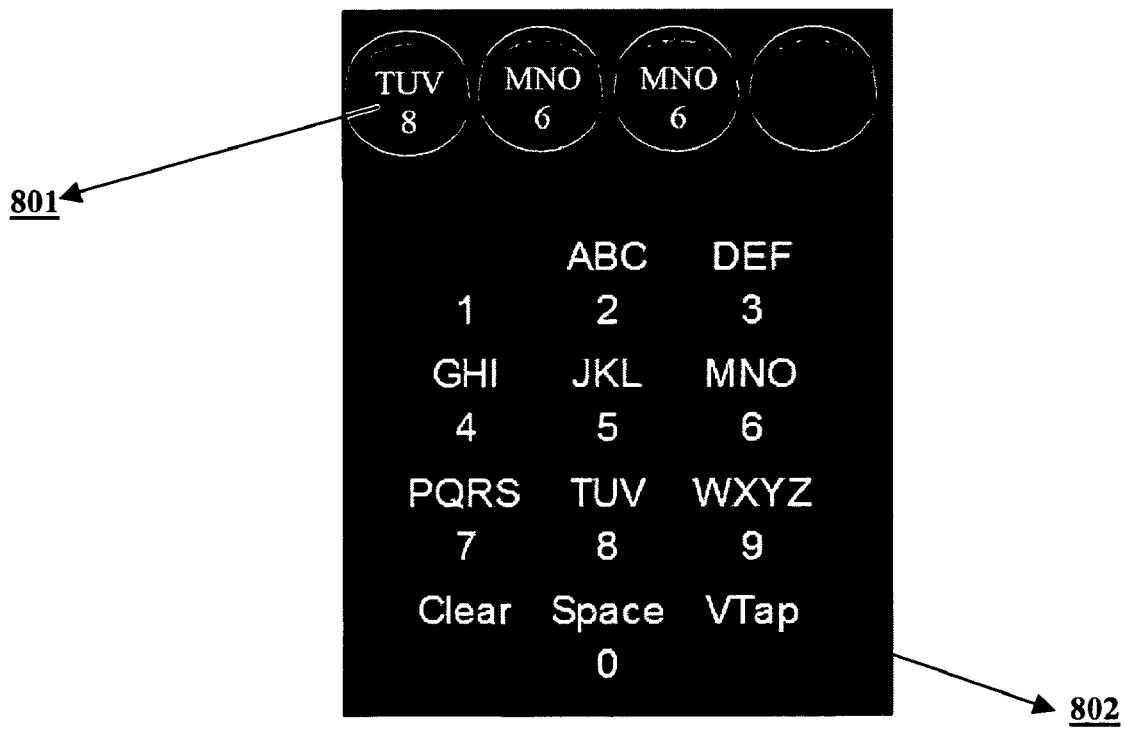
FIG. 12 illustrates an interface for text entry with the single press of a key according to certain embodiments.
Figure 13:
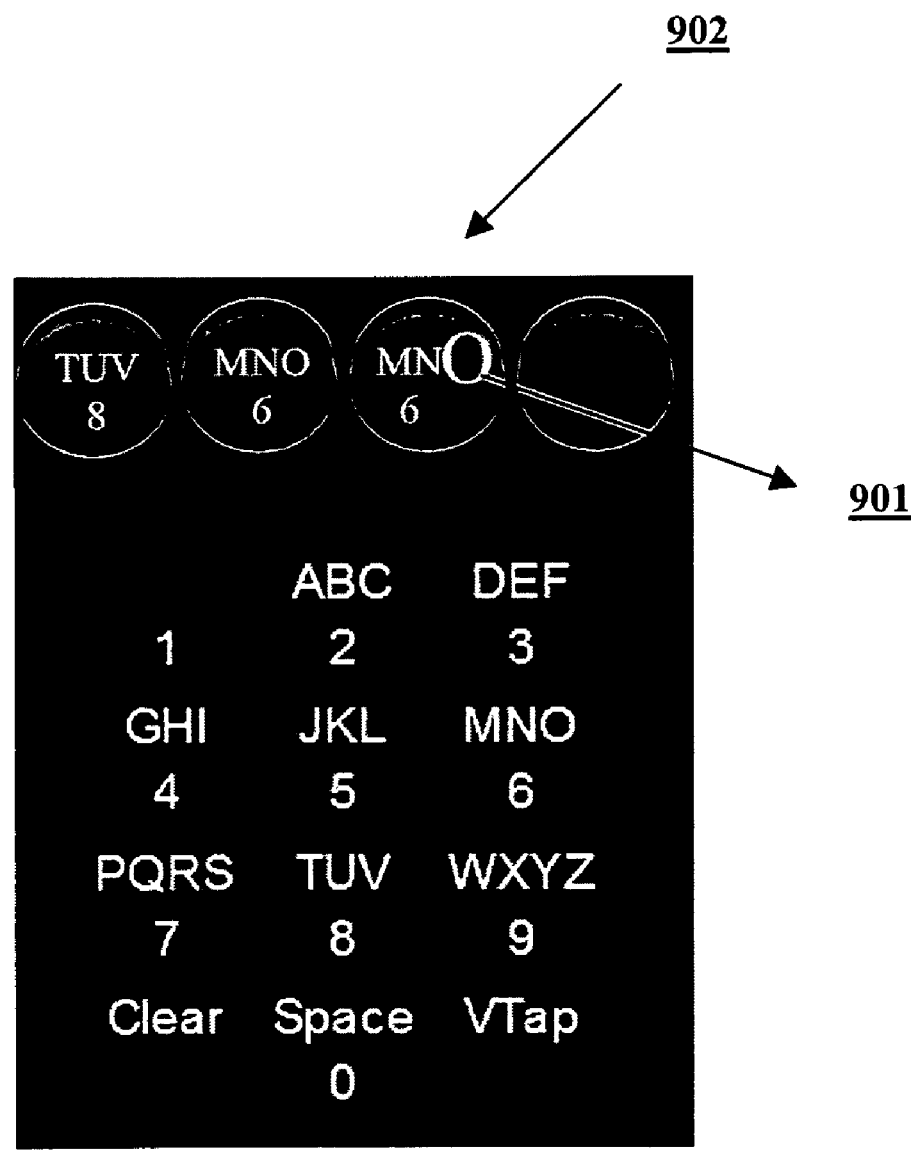
FIG. 13 illustrates an interface for text entry where a lazy approach to disambiguation is in progress according to certain embodiments.
Figure 14:
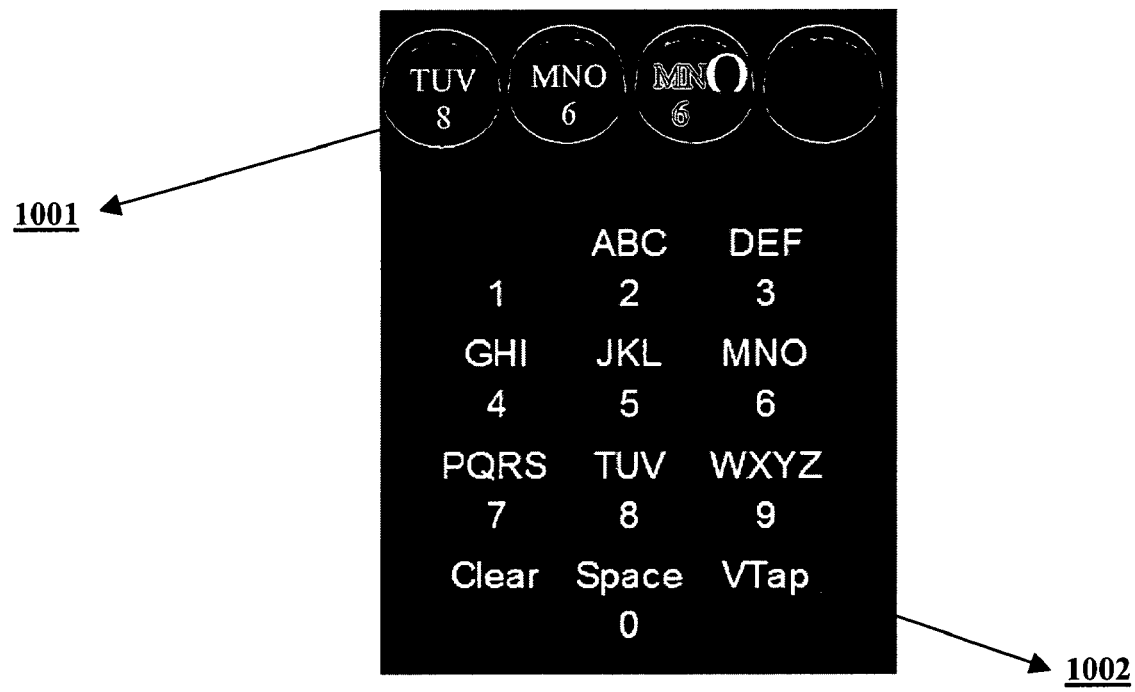
FIG. 14 illustrates an example of the competition of a lazy disambiguation process according to certain embodiments.

FIG. 12, FIG. 13 and FIG. 14 illustrate a further embodiment of the invention utilizing the VTAP style input described above. Using this input style, a user presses a single key for each character of the search text string to be entered. As user presses each key, the key and/or its associated letter cluster, is displayed on the screen, as shown by 801 (e.g., the user has entered the string "TOO" in FIG. 12). Thus, all letters and numerals associated with the particular key pressed are entered into a single character position of the search input. The system includes an interface for lazy disambiguation at the letter level, if required. The currently active input style may be indicated on the keypad, as by indication 802 and 1002.

In this example embodiment, the interface is used for an information retrieval system where the ambiguous text input could be disambiguated using a results space with relevance associated with each result. Thus, rather than presenting user with choices of search terms matching the ambiguous text entry, user is presented with results matching the ambiguous text input. If the user does not retrieve the results of interest, user can navigate through any of the character keys he pressed and disambiguate each character 901, as shown in FIG. 13. For example, the user can use a five-button control to navigate to cluster 902 and press the center button of the control to sequence through the letters of the cluster until the "O" letter is selected. Once a character on a key is disambiguated, the other alphabets in that key can be made visually less prominent, as shown by darkened characters 1001 in FIG. 14.

Embodiments described above may be used with the techniques and systems described in U.S. patent application Ser. No. 11/136,261, filed on May 24, 2005, entitled Method and System for Performing Searches for Television Programming Using Reduced Text Input, and U.S. patent application Ser. No. 11/246,432, filed on Oct. 7, 2005, entitled Method and System for Incremental Search With Reduced Text Entry Where the Relevance of Results is a Dynamically Computed Function of User Input Search String Character Count, both of which are hereby incorporated by reference. However, the techniques and system described in those applications are not necessary to practice the following invention. Thus, the embodiments described above can be used with other applications requiring text entry.

It will be appreciated that the scope of the present invention is not limited to the above-described embodiments, but rather is defined by the appended claims, and these claims will encompass modifications of and improvements to what has been described. For example, embodiments have been described in terms of entering text search queries using a 12-key keypad image. However, keypad images having a higher number of letters per key, and therefore fewer keys may be used with aspects of the invention.

What is claimed is:

1. A user-interface system for entering an alphanumeric string for identifying information content, the system comprising:

presentation logic for displaying on a presentation device an image of a virtual user alphanumeric interface, the virtual user alphanumeric interface including an image of an overloaded keypad that has a two dimensional configuration of alphanumeric clusters, a plurality of clusters corresponding to a set of selectable alphanumeric symbols including alphanumeric characters and alphanumeric numerals, the virtual user alphanumeric interface further including a string field for displaying the alphanumeric string of alphanumeric symbols selected by a user;

selection logic for receiving user actions from an input device with a five button interface, said interface including four navigation-direction controls and a selection control, said selection logic including logic, cooperative with the presentation logic, to present visual cues to aid in the navigation of said image of an overloaded keypad of the virtual user alphanumeric interface and the selection of an alphanumeric symbol, said logic to present visual cues including logic to signify on the image of the virtual user alphanumeric interface the user selection of an alphanumeric cluster while maintaining the display of unselected alphanumeric clusters of the two dimensional configuration of the alphanumeric clusters and including logic to cause the selected alphanumeric cluster to be displayed in the string field of the virtual user alphanumeric interface;

wherein the presentation device is a television and the input device is a physically separate remote control device.

2. The system of claim 1, wherein each symbol of a cluster is selectable by acting only on the corresponding cluster.

3. The system of claim 1, wherein an alphanumeric cluster is selectable via a cluster selection action and a cluster-symbol selection action selects one of the alphanumeric symbols of the selected cluster.

4. The system of claim 1, wherein the set of selectable alphanumeric characters is presented in alphabetical order.

5. The system of claim 1, wherein the set of selectable alphanumeric characters of at least one cluster is presented in an order according to an alphabet occurrence frequency of a predetermined language.

6. The system of claim 1, wherein the set of selectable alphanumeric characters of at least one cluster is presented in an order according to an alphabet occurrence frequency of characters in words that describe items in a searchable collection of information content.

7. The system of claim 1, wherein a presentation order of the set of selectable alphanumeric characters of at least one cluster is changed from an initial presentation order based on the received user actions.

8. A user-interface system for entering an alphanumeric string for identifying information content, the system comprising:

presentation logic for displaying on a presentation device an image of a virtual user alphanumeric interface, the virtual user alphanumeric interface including an image of an overloaded keypad that has a two dimensional configuration of alphanumeric clusters, a plurality of clusters corresponding to a set of selectable alphanumeric symbols including alphanumeric characters and alphanumeric numerals, the virtual user alphanumeric interface further including a string field for displaying the alphanumeric string of alphanumeric symbols selected by a user;

selection logic for receiving user actions from an input device, said selection logic including logic, cooperative with the presentation logic, to present visual cues to aid in the navigation of said image of an overloaded keypad of the virtual user alphanumeric interface and the selection of an alphanumeric cluster to cause the selected cluster to be displayed in the string field of the virtual user alphanumeric interface while maintaining the display of unselected alphanumeric clusters of the two dimensional configuration of the alphanumeric clusters; and disambiguation logic to receive the selected clusters and to disambiguate the selection to a probable user selection;

wherein the presentation device is a television and the input device is a physically separate remote control device.

9. A user-interface system for entering an alphanumeric string for identifying information content, the system comprising:

presentation logic for displaying on a presentation device an image of a virtual user alphanumeric interface, the virtual user alphanumeric interface including an image of an overloaded keypad that has a two dimensional configuration of alphanumeric clusters, a plurality of clusters corresponding to a set of selectable alphanumeric symbols including alphanumeric characters and alphanumeric numerals, the virtual user alphanumeric interface further including a string field for displaying the alphanumeric string of alphanumeric symbols selected by a user, wherein the alphanumeric characters are presented in a non-alphabetic order to facilitate selection of a probable string via reduced user selection actions; and selection logic for receiving user actions from an input device, said selection logic including logic, cooperative with the presentation logic, to present visual cues to aid in the navigation of said image of an overloaded keypad of the virtual user alphanumeric interface and the selection of an alphanumeric symbol, said logic to present visual cues including logic to signify on the image of the virtual user alphanumeric interface the user selection of an alphanumeric cluster while maintaining the display of unselected alphanumeric clusters of the two dimensional configuration of the alphanumeric clusters and including logic to cause the selected alphanumeric cluster to be displayed in the string field of the virtual user alphanumeric interface;

wherein the presentation device is a television and the input device is a physically separate remote control device.

10. The system of claim 9, wherein the alphanumeric characters are presented in an order according to an alphabet occurrence frequency of a predetermined language.

11. The system of claim 9, wherein the alphanumeric characters are presented in an order according to an alphabet occurrence frequency of characters in words that describe items in a searchable collection of information content.

12. The system of claim 9, wherein said selection logic further comprises logic to aid in the selection of a symbol from the set of symbols associated with the displayed alphanumeric cluster.

13. A user-interface method for entering an alphanumeric string for identifying information content, the method comprising:

displaying on a presentation device an image of a virtual user alphanumeric interface, the virtual user alphanumeric interface including an image of an overloaded keypad that has a two dimensional configuration of alphanumeric clusters, a plurality of clusters corresponding to a set of selectable alphanumeric symbols including alphanumeric characters and alphanumeric numerals, the virtual user alphanumeric interface further including a string field for displaying the alphanumeric string of alphanumeric symbols selected by a user;

receiving user actions from an input device with a five button interface, said interface including four navigation-direction controls and a selection control; and presenting visual cues to aid in the navigation of said image of an overloaded keypad of the virtual user alphanumeric interface and the selection of an alphanumeric symbol, including presenting visual cues to signify on the image of the virtual user alphanumeric interface the user selection of an alphanumeric cluster while maintaining the display of unselected alphanumeric clusters of the two dimensional configuration of the alphanumeric clusters and cause causing the selected alphanumeric cluster to be displayed in the string field of the virtual user alphanumeric interface;

wherein the presentation device is a television and the input device is a physically separate remote control device.

14. The method of claim 13, wherein each symbol of a cluster is selectable by acting only on the corresponding cluster.

15. The method of claim 13, wherein an alphanumeric cluster is selectable via a cluster selection action and a cluster-symbol selection action selects one of the alphanumeric symbols of the selected cluster.

16. The method of claim 13, wherein the set of selectable alphanumeric characters is presented in alphabetical order.

17. The method of claim 13, wherein the set of selectable alphanumeric characters of at least one cluster is presented in an order according to an alphabet occurrence frequency of a predetermined language.

18. The method of claim 13, wherein the set of selectable alphanumeric characters of at least one cluster is presented in an order according to an alphabet occurrence frequency of characters in words that describe items in a searchable collection of information content.

19. The method of claim 13, wherein a presentation order of the set of selectable alphanumeric characters of at least one cluster is changed from an initial presentation order based on the received user actions.

20. A user-interface method for entering an alphanumeric string for identifying information content, the method comprising:

displaying on a presentation device an image of a virtual user alphanumeric interface, the virtual user alphanumeric interface including an image of an overloaded keypad that has a two dimensional configuration of alphanumeric clusters, a plurality of clusters corresponding to a set of selectable alphanumeric symbols including alphanumeric characters and alphanumeric numerals, the virtual user alphanumeric interface further including a string field for displaying the alphanumeric string of alphanumeric symbols selected by a user, wherein the alphanumeric characters are presented in a non-alphabetic order to facilitate selection of a probable string via reduced user selection actions;

receiving user actions from an input device; and presenting visual cues to aid in the navigation of said image of an overloaded keypad of the virtual user alphanumeric interface and the selection of an alphanumeric symbol, including signifying on the image of the virtual user alphanumeric interface the user selection of an alphanumeric cluster while maintaining the display of unselected alphanumeric clusters of the two dimensional configuration of the alphanumeric clusters and causing the selected character alphanumeric cluster to be displayed in the string field of the virtual user alphanumeric interface;

wherein the presentation device is a television and the input device is a physically separate remote control device.

21. The method of claim 20, wherein the alphanumeric characters are presented in an order according to an alphabet occurrence frequency of a predetermined language.

22. The method of claim 20, wherein the alphanumeric characters are presented in an order according to an alphabet occurrence frequency of characters in words that describe items in a searchable collection of information content.

23. The system of claim 20, further comprising signifying on the image of the virtual user alphanumeric interface a user selection of a symbol from the set of symbols associated with the selected alphanumeric cluster.

* * * * *

UNITED STATES PATENT AND TRADEMARK OFFICE
CERTIFICATE OF CORRECTION

| | | |
|---|---|---|
| PATENT NO. | : 7,737,999 B2 | Page 1 of 2 |
| APPLICATION NO. | : 11/509909 | |
| DATED | : June 15, 2010 | |
| INVENTOR(S) | : Ardhanari et al. | |

It is certified that error appears in the above-identified patent and that said Letters Patent is hereby corrected as shown below:

Column 9, line 64, delete "compromise" and insert --comprising--.

Column 10, line 1-29, claim 13, should read as follows:

13. A user-interface method for entering an alphanumeric string for identifying information content, the method comprising:
displaying on a presentation device an image of a virtual user alphanumeric interface, the virtual user alphanumeric interface including an image of an overloaded keypad that has a two dimensional configuration of alphanumeric clusters, a plurality of clusters corresponding to a set of selectable alphanumeric symbols including alphanumeric characters and alphanumeric numerals, the virtual user alphanumeric interface further including a string field for displaying the alphanumeric string of alphanumeric symbols selected by a user;

receiving user actions from an input device with a five button interface, said interface including four navigation-direction controls and a selection control; and presenting visual cues to aid in the navigation of said image of an overloaded keypad of the virtual user alphanumeric interface and the selection of an alphanumeric symbol, including presenting visual cues to signify on the image of the virtual user alphanumeric interface the user selection of an alphanumeric cluster while maintaining the display of unselected alphanumeric clusters of the two dimensional configuration of the alphanumeric clusters and Signed and Sealed this Thirty-first Day of August, 2010

David J. Kappos
*Director of the United States Patent and Trademark Office*

CERTIFICATE OF CORRECTION (continued)
U.S. Pat. No. 7,737,999 B2

~~cause~~ causing the selected alphanumeric cluster to be displayed in the string field of the virtual user alphanumeric interface;

wherein the presentation device is a television and the input device is a physically separate remote control device.

Column 12, line 9, claim 23, delete "system" and insert --method--.